(12) United States Patent
Goi (10) Patent No.: US 7,028,461 B2
(45) Date of Patent: Apr. 18, 2006

(54) UNIAXIAL GAS TURBINE SYSTEM (75) Inventor: Tatsuhiko Goi, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/470,843

(22) PCT Filed: Feb. 5, 2002

(86) PCT No.: PCT/JP02/00933

§ 371 (c)(1),
(2), (4) Date: Jul. 31, 2003

(87) PCT Pub. No.: WO02/063153

PCT Pub. Date: Aug. 15, 2002

(65) Prior Publication Data
US 2004/0098988 A1 May 27, 2004

(30) Foreign Application Priority Data
Feb. 8, 2001 (JP) ............................. 2001-031637

(51) Int. Cl.
*F02C 7/36* (2006.01)
*F02G 9/56* (2006.01)

(52) U.S. Cl. ...................... 60/39.22; 60/39.24; 60/802; 74/DIG. 5

(58) Field of Classification Search .................. 60/801, 60/802, 39.24, 39.22; 74/DIG. 5
See application file for complete search history.

(56) References Cited

U.S. PATENT DOCUMENTS

| 3,598,211 A | * | 8/1971 | Fergle ........................ 60/791 |
| 3,903,755 A | | 9/1975 | Polak |
| 4,263,997 A | | 4/1981 | Poore |
| 4,344,336 A | * | 8/1982 | Carriere ...................... 475/48 |

(Continued)

FOREIGN PATENT DOCUMENTS

DE 34 38 893 A1 4/1986

(Continued)

*Primary Examiner*—Ted Kim
(74) *Attorney, Agent, or Firm*—Oliff & Berridge, PLC (57) ABSTRACT

A uniaxial gas turbine system, comprising a uniaxial gas turbine, a rotary machine driven by the uniaxial gas turbine, a continuously variable transmission for transmitting a driving force from the uniaxial gas turbine to the rotary machine, and a control device for controlling the speed of the uniaxial gas turbine to an optimum speed and controlling the gear ratio of the continuously variable transmission so that the speed of the rotary machine becomes a prescribed speed, whereby the speed of the gas turbine or the rotary machine can be optimized according to the load variation of the rotary machine driven by the gas turbine.

18 Claims, 13 Drawing Sheets

U.S. PATENT DOCUMENTS

| | | | |
|---|---|---|---|
| 4,449,423 A | 5/1984 | Carriere | |
| 4,525,661 A * | 6/1985 | Mucsy et al. | 322/4 |
| 4,700,590 A * | 10/1987 | Omitsu | 477/49 |
| 4,817,460 A * | 4/1989 | Reed | 475/25 |
| 5,184,526 A * | 2/1993 | Watanabe | 477/31 |
| 5,274,997 A * | 1/1994 | Inoue et al. | 60/39.511 |
| 5,309,778 A * | 5/1994 | Antonov | 74/15.86 |
| 6,035,629 A * | 3/2000 | Hilgeman et al. | 60/773 |
| 6,263,664 B1 * | 7/2001 | Tanigawa et al. | 74/DIG. 4 |
| 6,677,685 B1 * | 1/2004 | Pfleger et al. | 290/40 C |

FOREIGN PATENT DOCUMENTS

| | | |
|---|---|---|
| EP | 0 104 921 A2 | 4/1984 |
| EP | 0 635 639 A1 | 1/1995 |
| GB | 2 220 038 A | 12/1989 |
| JP | A 2-259296 | 10/1990 |
| JP | U 3-21527 | 3/1991 |
| JP | A 3-194130 | 8/1991 |
| JP | U 3-99841 | 10/1991 |
| JP | 07102995 | 4/1995 |
| JP | A 7-102995 | 4/1995 |

* cited by examiner

CONVENTIONAL ART

UNIAXIAL GAS TURBINE SYSTEM

TECHNICAL FIELD

The present invention relates to a uniaxial gas turbine system constituted so as to drive a rotary machine by a unaxial gas turbine.

BACKGROUND ART

Figure 12A:
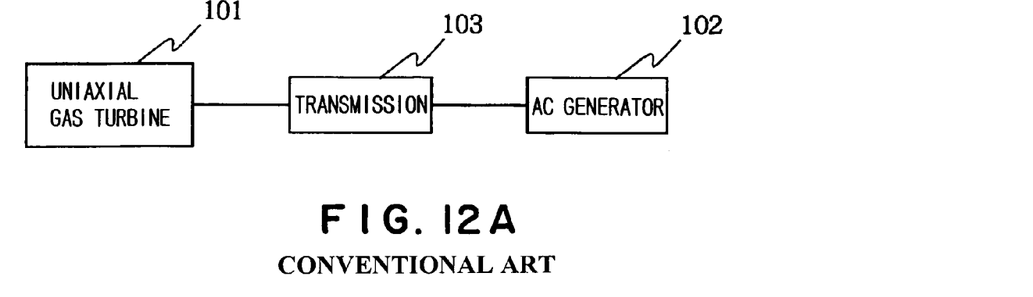
FIG. 12A is a block diagram showing a power generating system as a conventional uniaxial gas turbine system.

Conventionally, to drive a rotary machine such an AC generator or a pump by a gas turbine, a uniaxial gas turbine having a simple structure has been mainly used. When the AC generator is to be driven by the unaxial gas turbine, as shown in FIG. 12A, the revolution speed of a gas turbine 101 reaching several tens thousands rotations per minute is reduced to a required revolution speed by a transmission 103, and an AC generator 102 is driven. In such a gas turbine generating system, it is known that, when the AC generator 102 is not in full power generation, that is, in a case of partial load, the fuel efficiency can be enhanced by reducing the revolution speed of the gas turbine 101.

Figure 13:
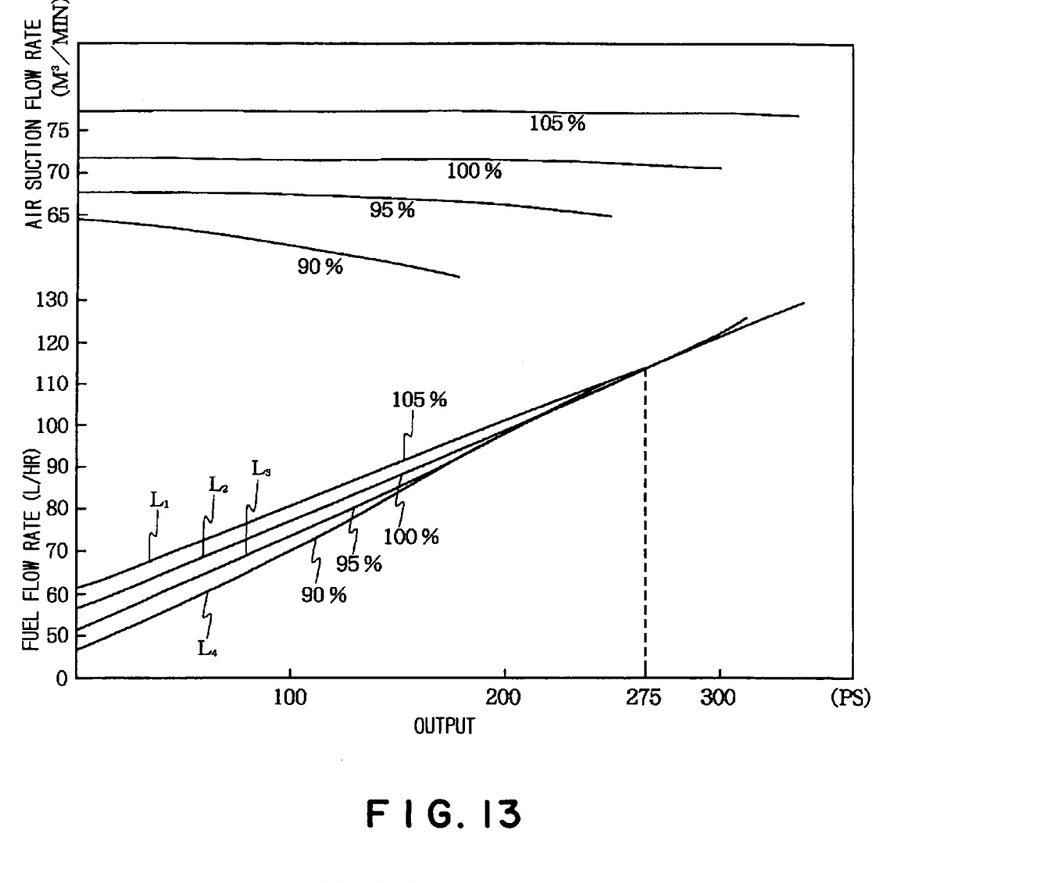
FIG. 13 is a drawing showing graphs indicating the revolution speed-fuel consumption characteristics of a gas turbine used in power generation equipment.

FIG. 13 shows the revolution speed-fuel consumption characteristics of a gas turbine having a rated operation output of 275 PS. In this drawing, the specified revolution speed during the rated operation is assumed as 100% and the relation between the output for each of the numbers of rotations 105%, 100%, 95%, and 90% and the fuel flow rate is indicated by the curves $L_1$, $L_2$, $L_3$, and $L_4$. As clearly shown in the drawing, under the operation condition of smaller output than that during the rated operation, as the revolution speed is reduced from the specified revolution speed during the rated operation, the fuel efficiency is enhanced.

However, in a conventional gas turbine generating system, the transmission 103 is a gear transmission having a constant speed variation ratio, so that when the revolution speed of the gas turbine 101 is changed, the revolution speed of the AC generator 102 is also changed and AC power at a constant frequency cannot be generated. Therefore, in a conventional gas turbine generating system, even when the generator 102 is in a partial load, the gas turbine 101 is actually operated at a revolution speed of 100%. As a result, the following problems are imposed.

(1) To maintain the revolution speed of 100%, unnecessary fuel is consumed and the fuel efficiency is degraded.

(2) The inlet temperature of the turbine rises due to unnecessary fuel, so that the life of the turbine is shortened.

(3) Due to imperfect combustion of apart of unnecessarily consumed fuel, the atmospheric pollution is promoted.

Figure 12B:
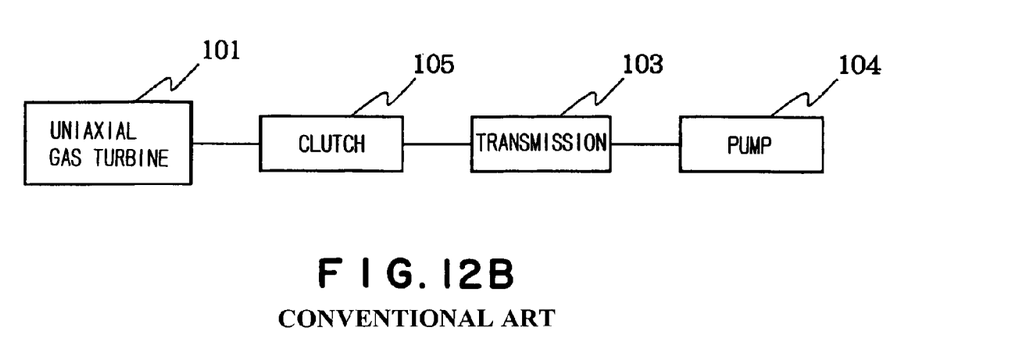
FIG. 12B is a block diagram showing a pump driving system as a conventional uniaxial gas turbine system.

Further, when a pump is to be driven by a uniaxial gas turbine, as shown in FIG. 12B, the revolution speed of a gas turbine 101 reaching several tens thousands rotations per minute is reduced to a required revolution speed by a transmission 103, and a pump 104 is driven. However, very large start torque is required to drive the pump 104 and the pump 104 cannot be started only by the uniaxial gas turbine. Therefore, in a conventional pump drive system, a huge fluid clutch 105 is required as a start clutch between the gas turbine 101 and the transmission 103.

However, in this system, when the pump 104 sucks mud, earth, and sand and the load is increased suddenly, it is effective to reduce the revolution speed of the pump and increase the torque. However, since the transmission 103 is a gear transmission having a constant speed variation ratio, a problem arises that the revolution speed cannot be reduced quickly in correspondence with a sudden increase of the load, and the gas turbine 101 is imposed to be stopped.

DISCLOSURE OF INVENTION

The present invention was developed with the foregoing problems of the related art in view and is intended to provide a uniaxial gas turbine system which can optimize, according to load changes of a rotary machine driven by a gas turbine, the revolution speeds of the gas turbine and the rotary machine driven by the gas turbine, and a control method for the system.

The uniaxial gas turbine system of the present invention comprises: a uniaxial gas turbine; a rotary machine driven by said uniaxial gas turbine; a continuously variable speed transmission of transmitting a drive force from said uniaxial gas turbine to said rotary machine; and a controller of controlling a revolution speed of said uniaxial gas turbine to an optimal revolution speed and controlling a speed variation ratio of said continuously variable speed transmission so as to set a revolution speed of said rotary machine to a desired revolution speed.

A method of the present invention for controlling a uniaxial gas turbine system having a uniaxial gas turbine, a rotary machine driven by said uniaxial gas turbine, and a continuously variable speed transmission of transmitting a drive force from said uniaxial gas turbine to said rotary machine, comprises: controlling a revolution speed of said uniaxial gas turbine to an optimal revolution speed; and controlling a speed variation ratio of said continuously variable speed transmission so as to set a revolution speed of said rotary machine to a desired revolution speed.

Preferably, said optimal revolution speed is set based on an optimal fuel consumption map indicating a revolution speed at which a fuel consumption of said uniaxial gas turbine is minimum according to a load of said rotary machine.

Preferably, said rotary machine has an AC generator; and said controller controls said speed variation ratio of said continuously variable speed transmission so as to keep a revolution speed of said AC generator constant.

Preferably, said rotary machine has a pump.

Preferably, said controller controls said speed variation ratio of said continuously variable speed transmission according to a drive torque of said pump.

Preferably, said pump is a vertical shaft pump; and said continuously variable speed transmission has a bevel gear mechanism for transmitting said drive force from said uniaxial gas turbine to said vertical shaft pump.

Preferably, said continuously variable speed transmission has a clutch for connecting or disconnecting a transmission of said drive force between said uniaxial gas turbine and said rotary machine; and said controller operates said clutch to disconnect said transmission of said drive force when said revolution speed of said uniaxial gas turbine is reduced due to a sudden increase in said load of said rotary machine.

Preferably, said continuously variable speed transmission is a continuously variable speed transmission of a power split system for distributing and transmitting said revolution speed of said uniaxial gas turbine.

Preferably, said continuously variable speed transmission has a traction drive and a planetary gear transmission mechanism.

According to the present invention constituted as mentioned above, the gas turbine and the rotary machine driven by the gas turbine can be operated or driven at optimal revolution speeds according to load changes of the rotary machine,

BEST MODE FOR CARRYING OUT THE INVENTION

The present invention will be explained hereunder on the basis of the embodiments with reference to the accompanying drawings. However, the present invention is not limited to those embodiments.

Figure 1:
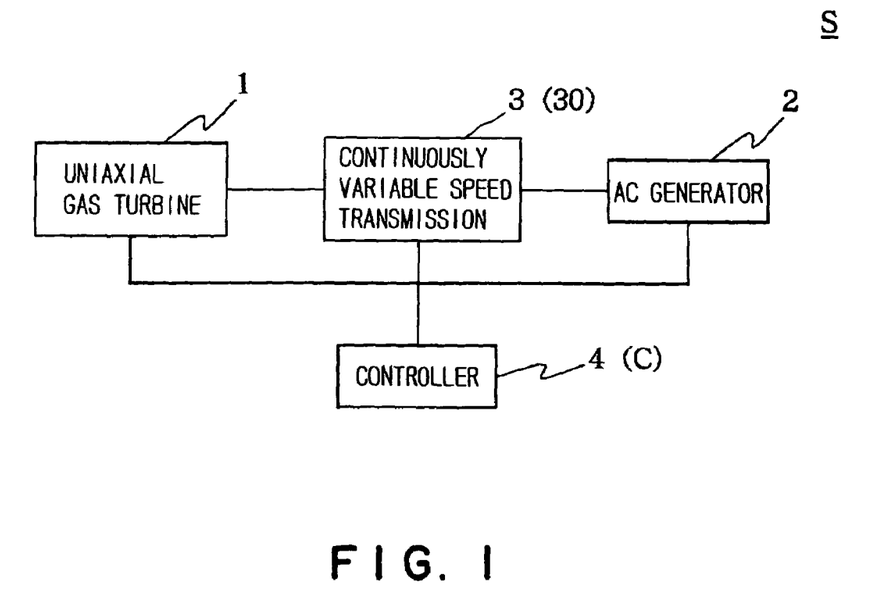
FIG. 1 is a block diagram of a uniaxial gas turbine system according to an embodiment of the present invention.

The uniaxial gas turbine system S according to an embodiment of the present invention shown in FIG. 1 operates the gas turbine at an optimal revolution speed according to the load of the generator. The uniaxial gas turbine system S, as shown in FIG. 1, includes as main components a uniaxial gas turbine (hereinafter, referred to as just a "gas turbine") 1, an AC generator 2 driven by the gas turbine 1, a continuously variable speed transmission 3 for keeping the revolution speed for driving the AC generator 2 constant regardless of changes in the revolution speed of the gas turbine 1, and a controller 4 for setting an optimal revolution speed of the gas turbine 1 according to the load (amount of generated electricity) of the AC generator 2 and controlling the gas turbine 1, the AC generator 2, and the continuously variable speed transmission 3.

The constitution of the gas turbine 1 and the AC generator 2 is the same as that of a conventional uniaxial gas turbine and AC generator, so that detailed explanation will be omitted.

For the continuously variable speed transmission 3, various continuously variable speed transmissions such as the traction drive type and belt type may be used. When the gas turbine 1 is of a great output type, from the viewpoint of durability and life improvement, it is preferable to use a continuously variable speed transmission 30 of a power split system. An example of the continuously variable speed transmission 30 of a power split system will be explained by referring to FIGS. 2 to 4.

Figure 2:
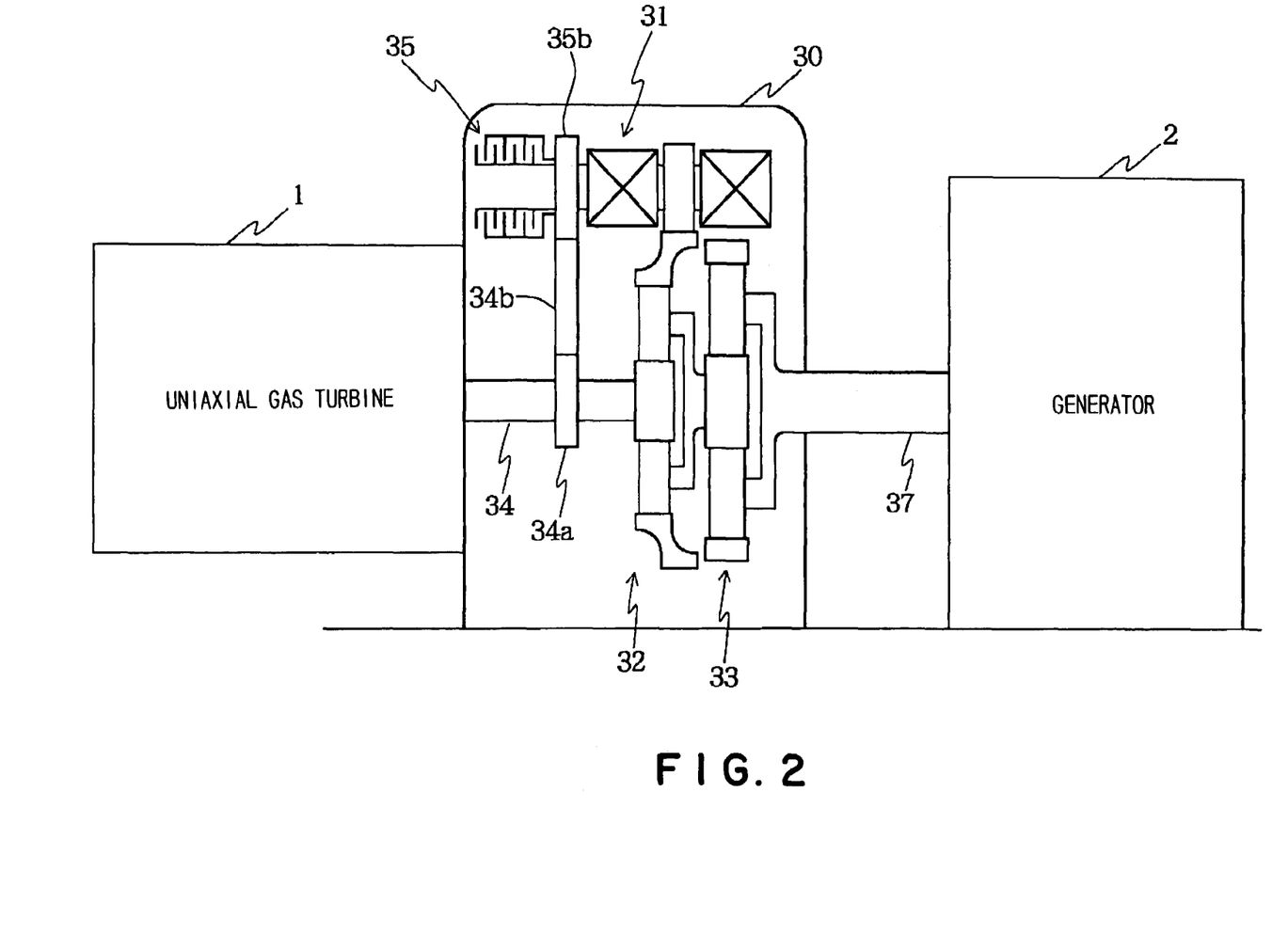
FIG. 2 is a drawing showing the schematic constitution of the continuously variable speed transmission of a power split system used in the embodiment shown in FIG. 1 together with the uniaxial gas turbine and generator.
Figure 3:
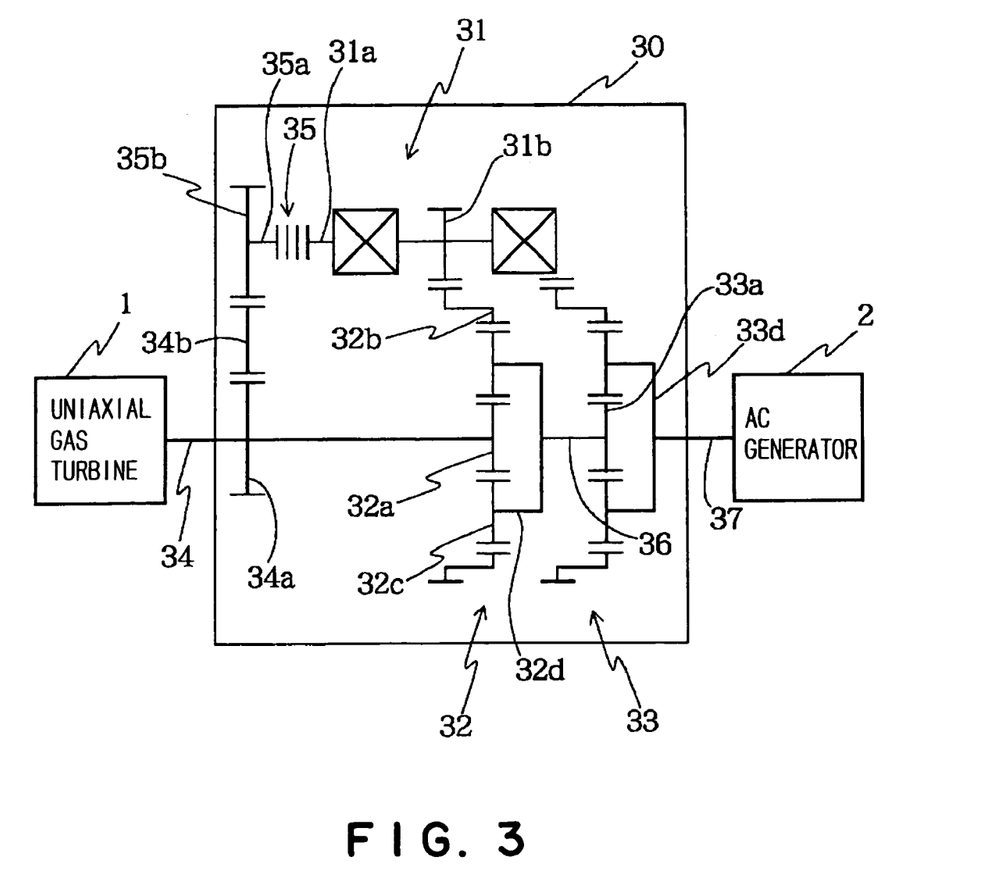
FIG. 3 is a drawing showing the system diagram of the continuously variable speed transmission of a power split system used in the embodiment shown in FIG. 1 together with the uniaxial gas turbine and generator.
Figure 4:
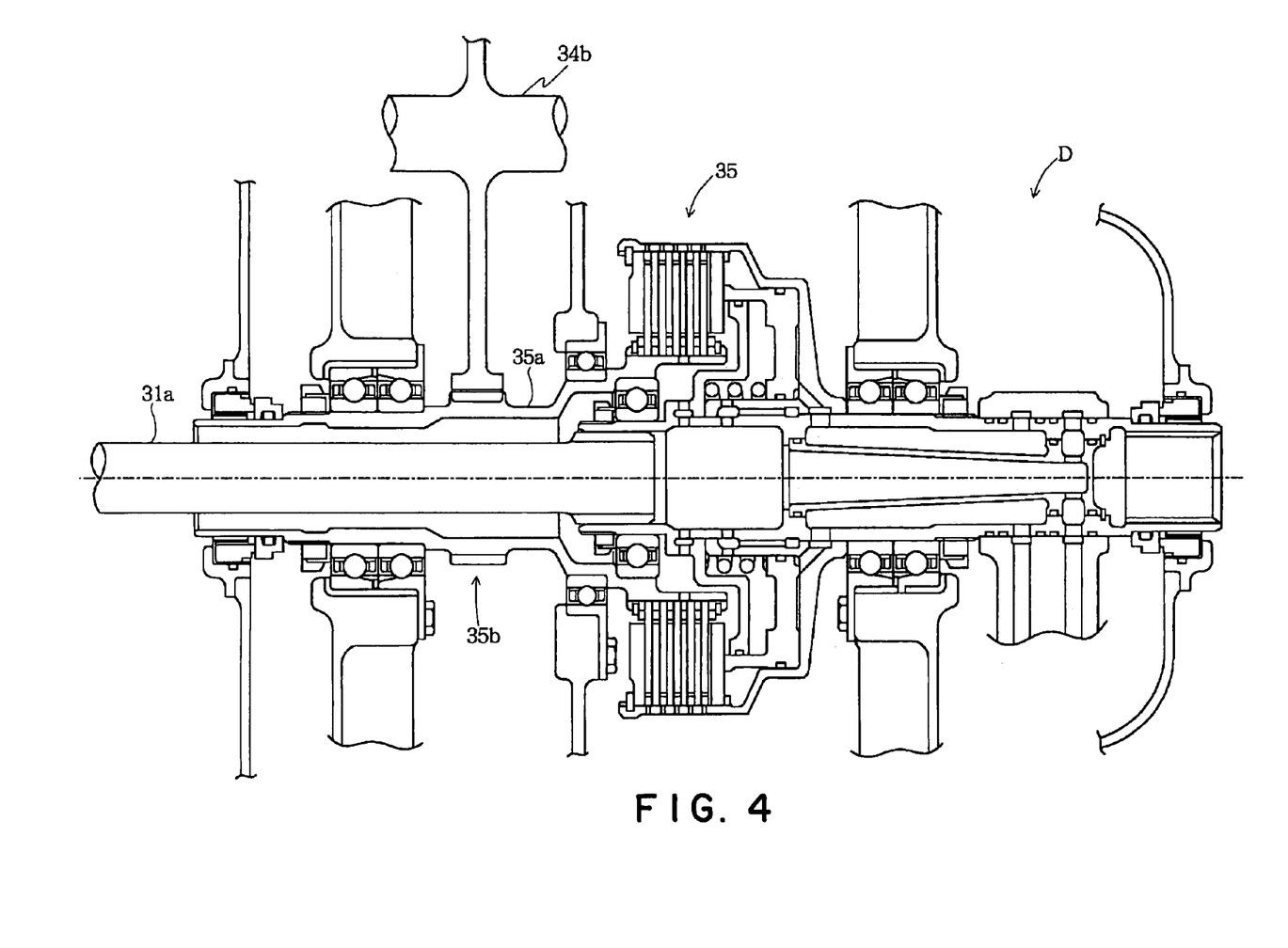
FIG. 4 is a drawing showing in detail a clutch used in the embodiment shown in FIG. 1 and its periphery.

In the continuously variable speed transmission 30, as shown in FIGS. 2, 3, and 4, a traction drive 31, a differential gear transmission mechanism 32, and a planetary gear transmission mechanism 33 are arranged so as to distribute and transmit the revolution speed of the gas turbine 1 which is input via an input shaft 34. The part indicated by a reference letter D in FIG. 4 indicates a drive mechanism of a clutch 35.

Concretely, the input shaft 34 is connected to a sun gear 32a of the differential gear transmission mechanism 32, and a gear 34a is installed on a middle part of the input shaft 34, and an idler gear 34b engaged with the gear 34a is engaged with a gear 35b installed on an input shaft 35a of the clutch 35, and an input shaft 31a of the traction drive 31 is connected on the output side of the clutch 35, thus the traction drive 31 is connected to the input shaft 34 via the clutch 35.

Further, an output gear 31b of the traction drive 31 is engaged with a ring gear 32b of the differential gear transmission mechanism 32, and a carrier 32d with which a plurality of planet gears 32c of the differential gear transmission mechanism 32 are engaged is connected to a sun gear 33a of the planet gear transmission mechanism 33 via an output shaft 36, and a gear 33d of the planet gear transmission mechanism 33 is connected to the AC generator 2 via an output shaft 37.

Figure 5:
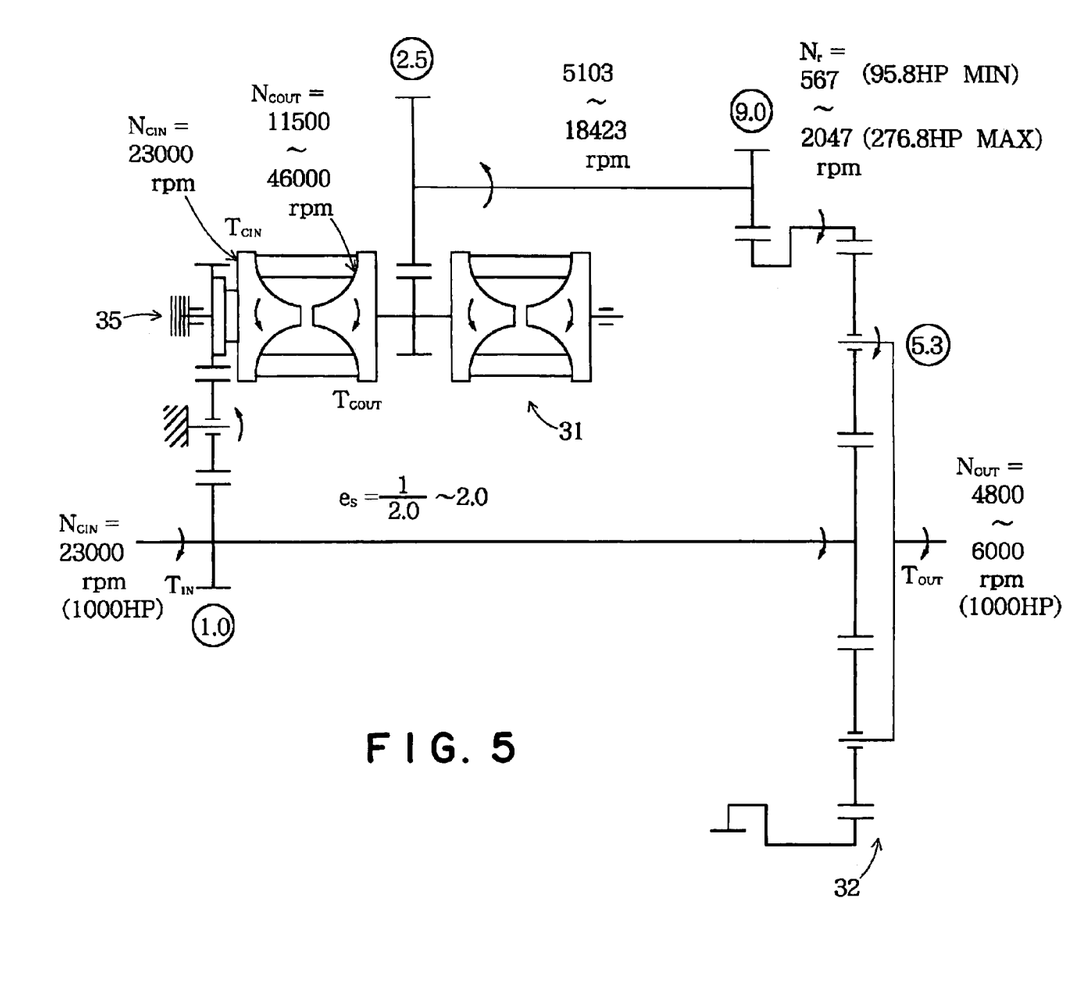
FIG. 5 is a drawing showing a setting example of the speed variation ratio of each component of the continuously variable speed transmission used in the embodiment shown in FIG. 1.

In the continuously variable speed transmission 30, the clutch 35 is installed between the input shaft 34 and the traction drive 31, that is, on the side of smaller transfer drive force compared with the side of the differential gear transmission mechanism 32, so that the on-state and off-state of the drive force transmitting system between the gas turbine 1 and the AC generator 2 can be switched by the miniature and light clutch 35. For example, when the speed variation ratio of each component of the continuously variable speed transmission 30 is set at the value indicated by each encircled numeral shown in FIG. 5, the power introduced into the traction drive 31 can be controlled to 27% or less of the total value (see FIG. 6). The symbol es shown in FIG. 5 indicates a speed variation ratio of the traction drive 31.

Figure 6:
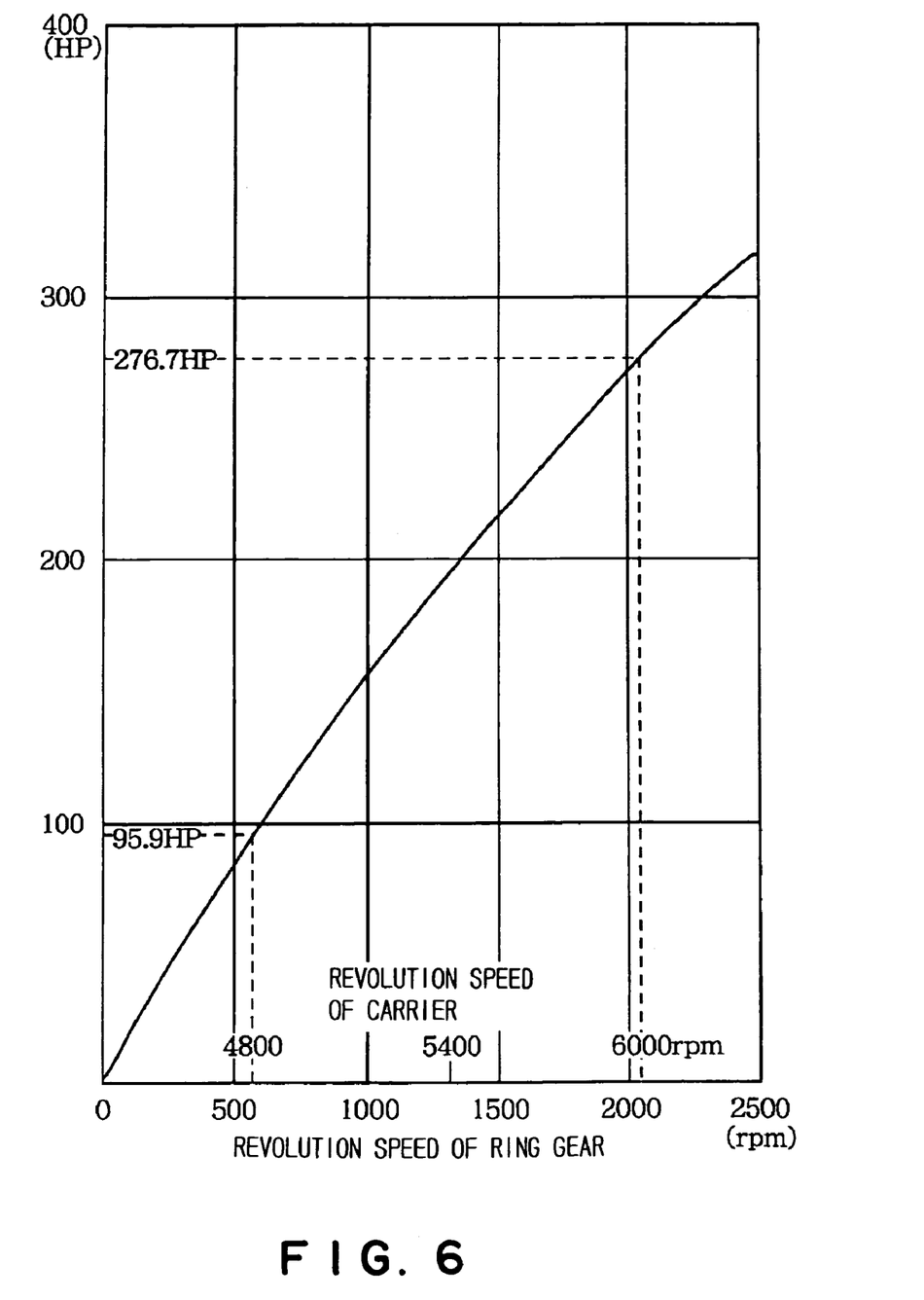
FIG. 6 is a graph showing the relation between the revolution speed of the ring gear and the revolution speed of the output shaft of the differential gear mechanism of the continuously variable speed transmission used in the embodiment shown in FIG. 1 and the drive force flowing into the traction drive.

FIG. 6 shows how the power introduced into the traction drive 31 is changed according to changes in the revolution speed of the carrier 33d of the planet gear transmission mechanism 33. The transverse axis indicates the revolution speed of the ring gear 33b of the planet gear transmission mechanism 33 and the revolution speed of the carrier 33d corresponding to the same. Further, the ordinate axis indicates the power (HP) introduced into the traction drive 31.

For example, when the revolution speed of the carrier 33d is 4800 rpm, the power introduced into the traction drive 31 is 95.9 HP and when the revolution speed is 6000 rpm, the power is 276.7 HP.

Figure 7:
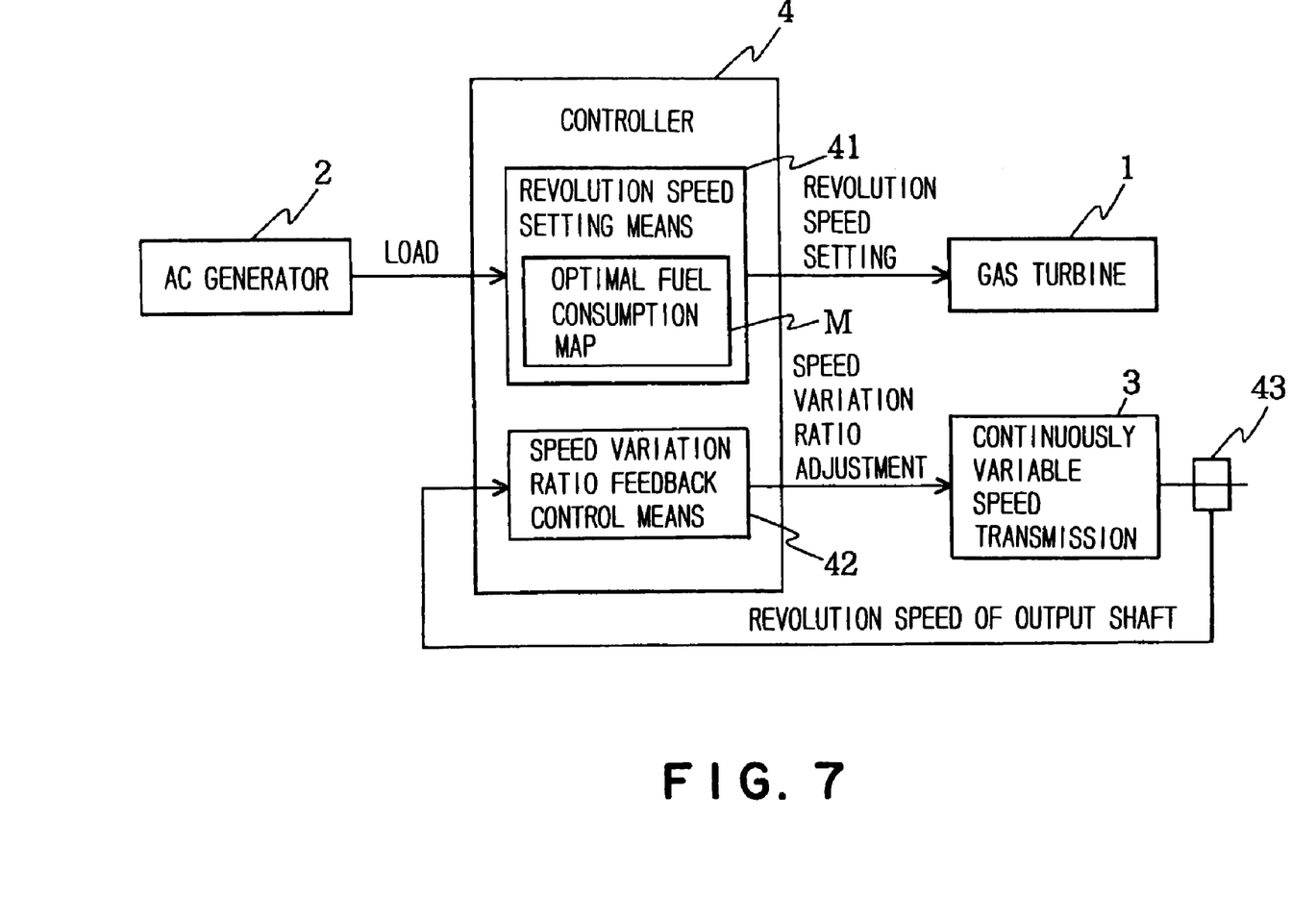
FIG. 7 is a block diagram of the controller of the embodiment shown in FIG. 1.

The controller 4, as shown in FIG. 7, has a revolution speed setting means 41 for setting the revolution speed of the gas turbine 1 according to the load of the AC generator 2 so as to obtain an optimal fuel efficiency and a speed variation ratio feedback control means 42 for executing feedback control of the speed variation ratio of the continuously variable speed transmission 3 so as to set the revolution speed of the output shaft 37 of the continuously variable speed transmission 3 to a predetermined revolution speed in order to set the revolution speed of the AC generator 2 to a predetermined revolution speed regardless of the revolution speed of the gas turbine 1 set by the revolution speed setting means 41. In this case, the revolution speed setting means 41 sets the revolution speed of the gas turbine 1 by an optimal fuel consumption map M which will be described later. Further, the speed variation ratio feedback control means 42 adjusts the speed variation ratio of the continuously variable speed transmission 3 on the basis of an output signal of the revolution speed sensor 43 which is installed on the output shaft 37 of the continuously variable speed transmission 3 and detects the revolution speed of the output shaft 37.

Figure 8:
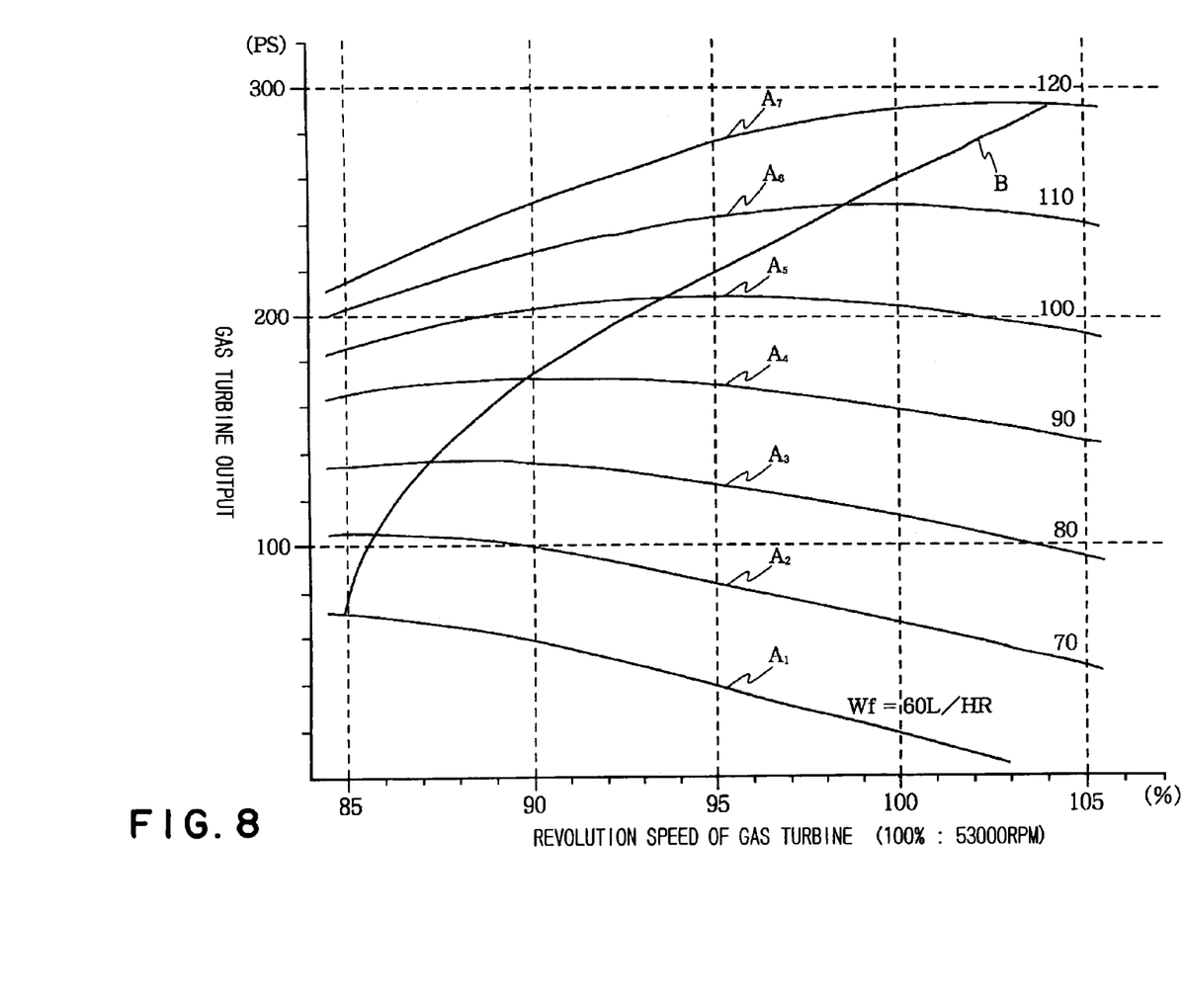
FIG. 8 is a schematic diagram for explaining the setting principle of an optimal fuel consumption map used in the embodiment shown in FIG. 1.

FIG. 8 shows the revolution speed-fuel consumption characteristics of a general gas turbine used in generating equipment. In the drawing, each of the curves $A_1$ to $A_7$ indicates the relation between the revolution speed (indicated by a ratio on the assumption that 53000 rpm is 100%) for each fuel flow rate Wf (Wf=60 to 120 l/hr) and the output (PS). Further, the curve B shown in the drawing is obtained by plotting and graphing the revolution speed for realizing the maximum output (hereinafter the curve B is referred to as an optimal fuel cost curve).

In this embodiment, as shown in FIG. 7, an optimal fuel consumption map M in which the optimal fuel cost curve B is prepared as map data is stored in the revolution speed setting means 41 and the revolution speed setting means 41 sets the revolution speed of the gas turbine 1 by the optimal fuel consumption map M according to the load of the AC generator 2. By doing this, the gas turbine 1 is operated at the revolution speed for minimizing the fuel consumption according to the load of the AC generator 2 so that the fuel efficiency can be enhanced. The controller 4 having such means 41 and 42 can be realized, for example, by storing a program corresponding to the means 41 and 42 in a computer.

As mentioned above, according to this embodiment, the revolution speed of the gas turbine 1 is set by the optimal fuel consumption map M according to the load of the AC generator 2 and the speed variation ratio of the continuously variable speed transmission 3 is subjected to feedback control so as to set the revolution speed of the AC generator 2 to a predetermined revolution speed regardless of the set revolution speed of the gas turbine 1, so that the gas turbine 1 can be operated at the maximum efficiency according to the load of the AC generator 2. Therefore, the fuel efficiency is enhanced, and the atmospheric pollution due to, for example, imperfect combustion of surplus fuel is prevented, and the inlet temperature of the turbine does not rise unnecessarily, and the life span of the turbine can be lengthened. Furthermore, the revolution speed of the AC generator 2 can be changed easily by the continuously variable speed transmission 3, so that the generation frequency can be easily switched, for example, between 50 Hz and 60 Hz.

Figure 9:
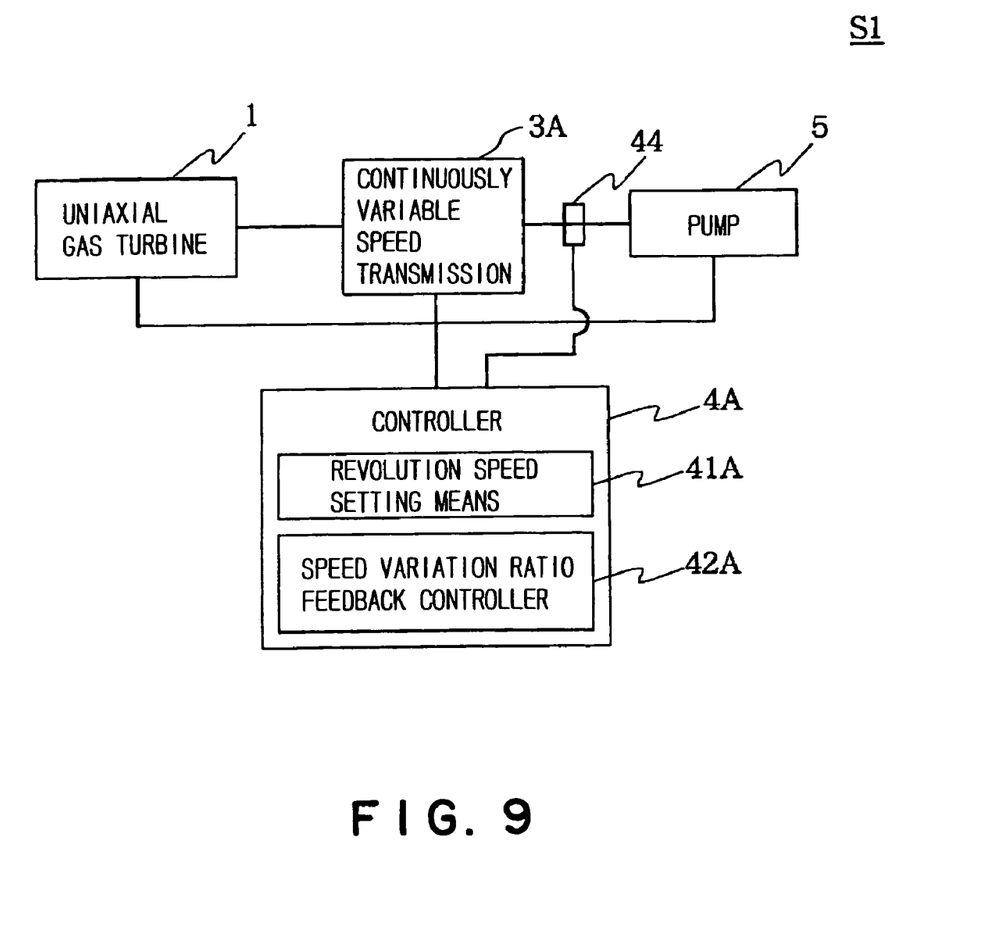
FIG. 9 is a block diagram of a uniaxial gas turbine system according to another embodiment of the present invention.

Next, the uniaxial gas turbine system according to another embodiment of the present invention will be explained. The uniaxial gas turbine system S1 of this embodiment shown in FIG. 9 is a modification of the uniaxial gas turbine system S of the embodiment shown in FIG. 1. Namely, the rotary machine to be driven is changed from the AC generator to a pump and, accordingly, the continuously variable speed transmission and controller are modified. A numeral 44 shown in FIG. 9 indicates a torque sensor.

Figure 10:
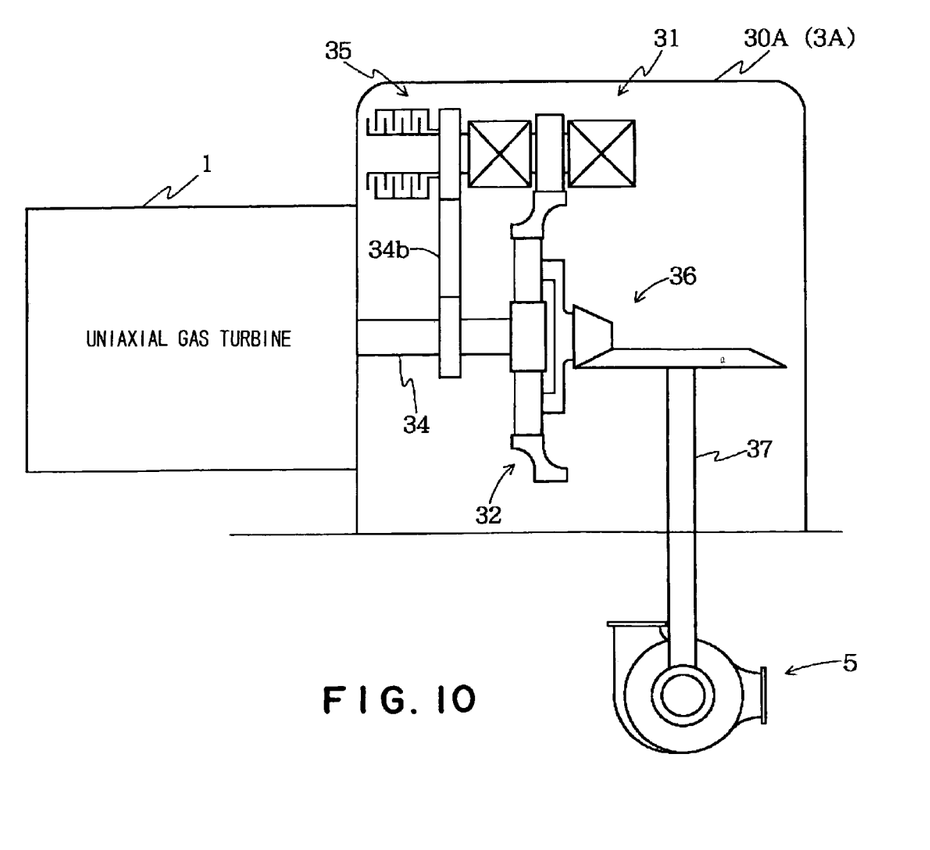
FIG. 10 is a drawing showing the schematic constitution of the continuously variable speed transmission of a power split system used in the embodiment shown in FIG. 1 together with the uniaxial gas turbine and pump.

As shown in FIG. 10, in this embodiment, as a pump 5, a vertical shaft pump is used and, accordingly, a continuously variable speed transmission 3A changes the transmitting direction of the rotation drive force by 90°.

A continuously variable speed transmission 30A of a power split system shown in FIG. 10 as an example of the continuously variable speed transmission 3A includes the traction drive 31 and the differential gear transmission mechanism 32 which are arranged so as to distribute and transmit the revolution speed of the gas turbine 1 input via the input shaft 34.

Figure 11:
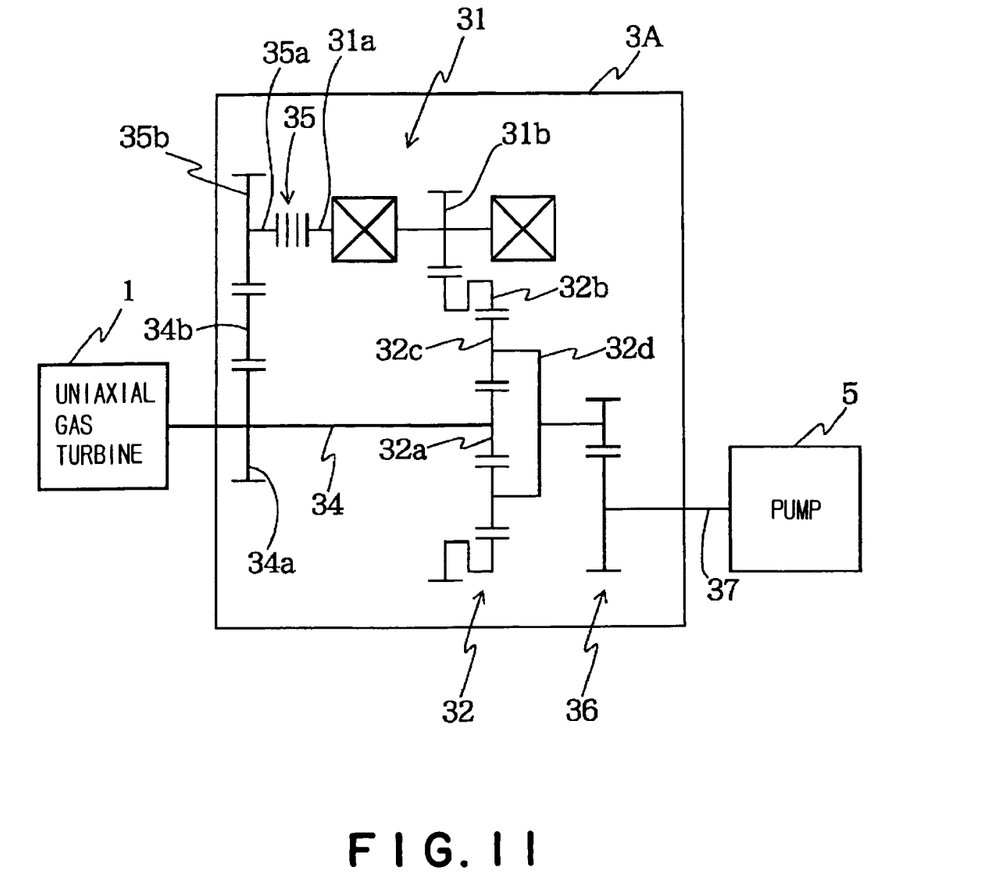
FIG. 11 is a drawing showing the flow diagram of the continuously variable speed transmission of a power split system used in the embodiment shown in FIG. 1 together with the uniaxial gas turbine and pump.

Concretely, as shown in FIG. 11, the input shaft 34 is connected to the sun gear 32a of the differential gear transmission mechanism 32, and the gear 34a is installed on the middle part of the input shaft 34, and the idler gear 34b engaged with the gear 34a is engaged with the gear 35b installed on the input shaft 35a of the clutch 35, and the input shaft 31a of the traction drive 31 is connected on the output side of the clutch 35, thus the traction drive 31 is connected to the input shaft 34 via the clutch 35.

Further, the output gear 31b of the traction drive 31 is engaged with the ring gear 32b of the differential gear transmission mechanism 32 and the carrier 32d with which a plurality of planet gears 32c of the differential gear transmission mechanism 32 are engaged is connected to the output shaft 37 of the continuously variable speed transmission 3A (30A) via the bevel gear mechanism 36.

The pump 5 may be a horizontal shaft pump and, in this case, there is no need to change the transmitting direction of the rotation drive force.

As shown in FIG. 9, the controller 4A has a revolution speed setting means 41A and a speed variation ratio feedback control means 42A and adjusts the revolution speed of the pump 5 according to changes in the load of the pump 5. Concretely, when the pump 5 sucks mud, earth, sand, or driftwood and the load is increased, the speed variation ratio feedback control means 42A adjusts the speed variation ratio of the continuously variable speed transmission 3, reduces the revolution speed of the pump 5, and increases the torque, thereby controls so as to prevent the gas turbine 1 from stopping. When the torque is changed suddenly, to prevent the gas turbine 1 from stopping, the control means 42A may open the clutch 35 and control so as to interrupt the power transmitting between the gas turbine 1 and the pump 5.

Further, a torque meter (not shown in the drawing) is installed on the output shaft 37 of the continuously variable speed transmission 3 and when the detected torque exceeds the specified value, the control means 42A may control so as to open the clutch 35 in order to prevent damage of each unit.

As mentioned above, according to this embodiment, the speed variation ratio of the continuously variable speed transmission 3 is properly adjusted according to changes in the load of the pump 5, thus the revolution speed of the pump 5 can be changed quickly, so that the situation that the gas turbine 1 is stopped due to a sudden increase in the load of the pump 5 will not be caused. Further, when the load of the pump 5 is suddenly increased, by controlling so as to open the clutch 35, stop of the gas turbine 1 and damage of each unit can be avoided. Furthermore, when the continuously variable speed transmission 30A of a power split system is used for the continuously variable speed transmission 3A and a clutch is installed on one side of the drive force transmitting system, preferably on the side of smaller transmitting drive force, the drive force transmitting system can be connected or disconnected by a miniature and light clutch, thus a conventional large start clutch can be omitted.

The present invention is explained above on the basis of this embodiment. However, the present invention is not limited to this embodiment and may be modified variously. For example, in the present invention, the rotary machine driven by the gas turbine is not limited to the AC generator and pump and various rotary machines may be used.

As mentioned above in detail, according to the present invention, using a uniaxial gas turbine having a simple structure, the same effect as that when a biaxial gas turbine is used can be produced. Namely, since the revolution speed of the gas turbine is reduced by the continuously variable speed transmission, even when the load of the rotary machine to be driven is changed, an excellent effect that the gas turbine is operated at an optimal revolution speed and the revolution speed of the rotary machine to be driven can be set to a desired revolution speed can be obtained.

Further, according the preferred embodiment of the present invention, the gas turbine can be operated an optimal revolution speed according to the load of the AC generator, so that an excellent effect that fuel consumption can be minimized and the fuel efficiency is enhanced can be obtained. Further, the fuel feed rate is minimized, so that an excellent effect can be obtained that an abnormal rise of the inlet temperature of the turbine is prevented, and the life of the turbine is lengthened, and the atmospheric pollution due to imperfect combustion of surplus fuel can be prevented. Furthermore, since the revolution speed of the AC generator can be easily changed by the continuously variable speed transmission, an excellent effect can be obtained that the generation frequency can be easily switched, for example, between 50 Hz and 60 Hz.

According to another embodiment of the present invention, the revolution speed of the pump can be changed quickly, so that an excellent effect can be obtained that the gas turbine will not be stopped due to a sudden increase of the load. Further, according to a more preferable embodiment using a continuously variable speed transmission of a power split system, an excellent effect can be obtained that the start clutch can be made smaller and lighter or can be eliminated when applicable.

INDUSTRIAL APPLICABILITY

According to the present invention, the uniaxial gas turbine system can be used as a system for driving the rotary machine such as the AC generator and pump by the uniaxial gas turbine.

The invention claimed is:

1. A uniaxial gas turbine system comprising:
   a uniaxial gas turbine;
   a rotary machine driven by said uniaxial gas turbine;
   a continuously variable speed transmission of transmitting a drive force from said uniaxial gas turbine to said rotary machine; and
   a controller of controlling a revolution speed of said uniaxial gas turbine to an optimal revolution speed and controlling a speed variation ratio of said continuously variable speed transmission so as to set a revolution speed of said rotary machine to a desired revolution speed,
   wherein said continuously variable speed transmission is a continuously variable speed transmission of a power split system for distributing and transmitting said revolution speed of said uniaxial gas turbine,
   said continuously variable speed transmission has a traction drive disposed on a low power side of said continuously variable speed transmission, and
   a clutch for connecting or disconnecting a transmission of said drive force between said uniaxial gas turbine and said rotary machine is disposed on an input side of said traction drive.

2. A uniaxial gas turbine system according to claim 1, wherein said optimal revolution speed is set based on an optimal fuel consumption map indicating a revolution speed at which a fuel consumption of said uniaxial gas turbine is minimum according to a load of said rotary machine.

3. A uniaxial gas turbine system according to claim 1, wherein said rotary machine has an AC generator, and
   said controller controls said speed variation ratio of said continuously variable speed transmission so as to keep a revolution speed of said AC generator constant.

4. A uniaxial gas turbine system according to claim 1, wherein said rotary machine has a pump.

5. A uniaxial gas turbine system according to claim 4, wherein said controller controls said speed variation ratio of said continuously variable speed transmission according to a drive torque of said pump.

6. A uniaxial gas turbine system according to claim 4, wherein said pump is a vertical shaft pump, and
   said continuously variable speed transmission has a bevel gear mechanism for transmitting said drive force from said uniaxial gas turbine to said vertical shaft pump.

7. A uniaxial gas turbine system according to claim 1, wherein said controller operates said clutch to disconnect said transmission of said drive force when said revolution speed of said uniaxial gas turbine is reduced due to a sudden increase in said load of said rotary machine.

8. A uniaxial gas turbine system according to claim 1, wherein said continuously variable speed transmission has a traction drive and a planetary gear transmission mechanism.

9. A uniaxial gas turbine system according to claim 8, wherein the clutch is disposed on a low torque side of said continuously variable speed transmission.

10. A method for controlling a uniaxial gas turbine system having a uniaxial gas turbine, a rotary machine driven by said uniaxial gas turbine, and a continuously variable speed transmission of transmitting a drive force from said uniaxial gas turbine to said rotary machine, comprising:
    controlling a revolution speed of said uniaxial gas turbine to an optimal revolution speed; and
    controlling a speed variation ratio of said continuously variable speed transmission so as to set a revolution speed of said rotary machine to a desired revolution speed,
    wherein said continuously variable speed transmission is a continuously variable speed transmission of a power split system for distributing and transmitting said revolution speed of said uniaxial gas turbine,
    said continuously variable speed transmission has a traction drive disposed on a low power side of said continuously variable speed transmission, and a clutch for connecting or disconnecting a transmission of said drive force between said uniaxial gas turbine and said rotary machine is disposed on an input side of said traction drive.

11. A method for controlling a uniaxial gas turbine system according to claim 10, wherein said optimal revolution speed is set based on an optimal fuel consumption map indicating a revolution speed at which a fuel consumption of said uniaxial gas turbine is minimum according to a load of said rotary machine.

12. A method for controlling a uniaxial gas turbine system according to claim 10, wherein said rotary machine has an AC generator, and said method controls said speed variation ratio of said continuously variable speed transmission so as to keep a revolution speed of said AC generator constant.

13. A method for controlling a uniaxial gas turbine system according to claim 10, wherein said rotary machine has a pump.

14. A method for controlling a uniaxial gas turbine system according to claim 13, wherein said method controls said speed variation ratio of said continuously variable speed transmission according to a drive torque of said pump.

15. A method for controlling a uniaxial gas turbine system according to claim 13, wherein said pump is a vertical shaft pump, and said continuously variable speed transmission has a bevel gear mechanism for transmitting said drive force from said uniaxial gas turbine to said vertical shaft pump.

16. A method for controlling a uniaxial gas turbine system according to claim 10, wherein said method operates said clutch to disconnect said transmission of said drive force when said revolution speed of said uniaxial gas turbine is reduced due to a sudden increase in said load of said rotary machine.

17. A method for controlling a uniaxial gas turbine system according to claim 10, wherein said continuously variable speed transmission has a traction drive and a planetary gear transmission mechanism.

18. A method for controlling a uniaxial gas turbine system according to claim 17, wherein the clutch is disposed on a low torque side of said continuously variable speed transmission.

\* \* \* \* \*